US011556720B2

(12) United States Patent
Kwatra et al.

(10) Patent No.: US 11,556,720 B2
(45) Date of Patent: Jan. 17, 2023

(54) CONTEXT INFORMATION REFORMATION AND TRANSFER MECHANISM AT INFLECTION POINT

(71) Applicant: INTERNATIONAL BUSINESS MACHINES CORPORATION, Armonk, NY (US)

(72) Inventors: Shikhar Kwatra, Durham, NC (US); Jennifer L. Szkatulski, Rochester, MI (US); Erick Black, Franktown, CO (US); John E. Petri, St. Charles, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 337 days.

(21) Appl. No.: 16/866,869

(22) Filed: May 5, 2020

(65) Prior Publication Data
US 2021/0350086 A1 Nov. 11, 2021

(51) Int. Cl.
G06F 40/40 (2020.01)
G06N 20/00 (2019.01)
H04L 9/40 (2022.01)
G06F 40/242 (2020.01)

(52) U.S. Cl.
CPC ............ G06F 40/40 (2020.01); G06F 40/242 (2020.01); G06N 20/00 (2019.01); H04L 63/10 (2013.01)

(58) Field of Classification Search
CPC .... G06F 40/40; G06F 40/242; G06F 21/6245; G06F 16/337; G06F 16/24578; G06F 16/43; G06N 20/00; H04L 63/10; G10L 25/66; G10L 25/72; A61B 5/4803; A61B 5/1176; A61B 5/167
USPC .......................................................... 704/9
See application file for complete search history.

(56) References Cited

U.S. PATENT DOCUMENTS

| 9,019,174 | B2 | 4/2015 | Jerauld | |
|---|---|---|---|---|
| 9,324,078 | B2 | 4/2016 | Palahnuk | |
| 2013/0018838 | A1 | 1/2013 | Parnaby et al. | |
| 2014/0081633 | A1* | 3/2014 | Badaskar | G06F 16/43 707/723 |
| 2015/0286710 | A1 | 10/2015 | Chang et al. | |
| 2016/0170996 | A1* | 6/2016 | Frank | G06F 16/337 707/748 |
| 2016/0224803 | A1* | 8/2016 | Frank | G06F 21/6245 |
| 2016/0300252 | A1* | 10/2016 | Frank | G06F 16/24578 |
| 2018/0020285 | A1* | 1/2018 | Zass | G10L 25/72 |

(Continued)

FOREIGN PATENT DOCUMENTS

CN 107943299 4/2018
WO WO-2015091223 A1 * 6/2015 ............. A61B 5/167

Primary Examiner — Susan I McFadden
(74) Attorney, Agent, or Firm — F. Chau & Associates, LLC

(57) ABSTRACT

Systems, methods, and apparatus for communication assistance for aneurotypical individuals are described. Embodiments of the systems, methods, and apparatus may receive input data during a communication between a first user and a second user, generate feedback based on the input data using a shared network comprising psychological information about the second user, wherein the shared network is based at least in part on interactions between the second user and a third user, and provide the feedback to the first user during the communication.

19 Claims, 9 Drawing Sheets

(56) References Cited

U.S. PATENT DOCUMENTS

2018/0197624 A1* 7/2018 Robaina ............... A61B 5/1176
2019/0385711 A1* 12/2019 Shriberg .............. A61B 5/4803
2020/0066294 A1* 2/2020 Zass ........................ G10L 25/66

* cited by examiner

CONTEXT INFORMATION REFORMATION AND TRANSFER MECHANISM AT INFLECTION POINT

BACKGROUND

The following relates generally to communication assistance, and more specifically to communication assistance for aneurotypical individuals.

A large number of people in our society may be considered aneurotypical, such as those with autism, or those who have developmental or attention-deficit disorders. In some cases, it may be difficult for neurotypical individuals to determine the psychological state of an aneurotypical conversation partner, or to determine how to respond appropriately during the course of a conversation. This may cause one or both individuals confused, agitated, or to misunderstand the context of the conversation.

These problems may disrupt normal conversations between an aneurotypical individual and a neurotypical individual. Therefore, there is a need in the art for systems and methods to improve conversational understanding among neurotypical and aneurotypical individuals.

SUMMARY

A method, apparatus, non-transitory computer readable medium, and system for communication assistance for aneurotypical individuals are described. Embodiments of the method, apparatus, non-transitory computer readable medium, and system may receive input data during a communication between a first user and a second user, generate feedback based on the input data using a shared network comprising psychological information about the second user, wherein the shared network is based at least in part on interactions between the second user and a third user, and provide the feedback to the first user during the communication.

An apparatus, system, and method for communication assistance for aneurotypical individuals are described. Embodiments of the apparatus, system, and method may include an input component configured to receive input data during a communication between a first user and a second user, a shared network configured to generate feedback based on the input data, wherein the shared network comprises psychological information about the second user, wherein the shared network is based at least in part on interactions between the second user and a third user, and a feedback component configured to provide the feedback to the first user during the communication.

DETAILED DESCRIPTION

Figure 1:
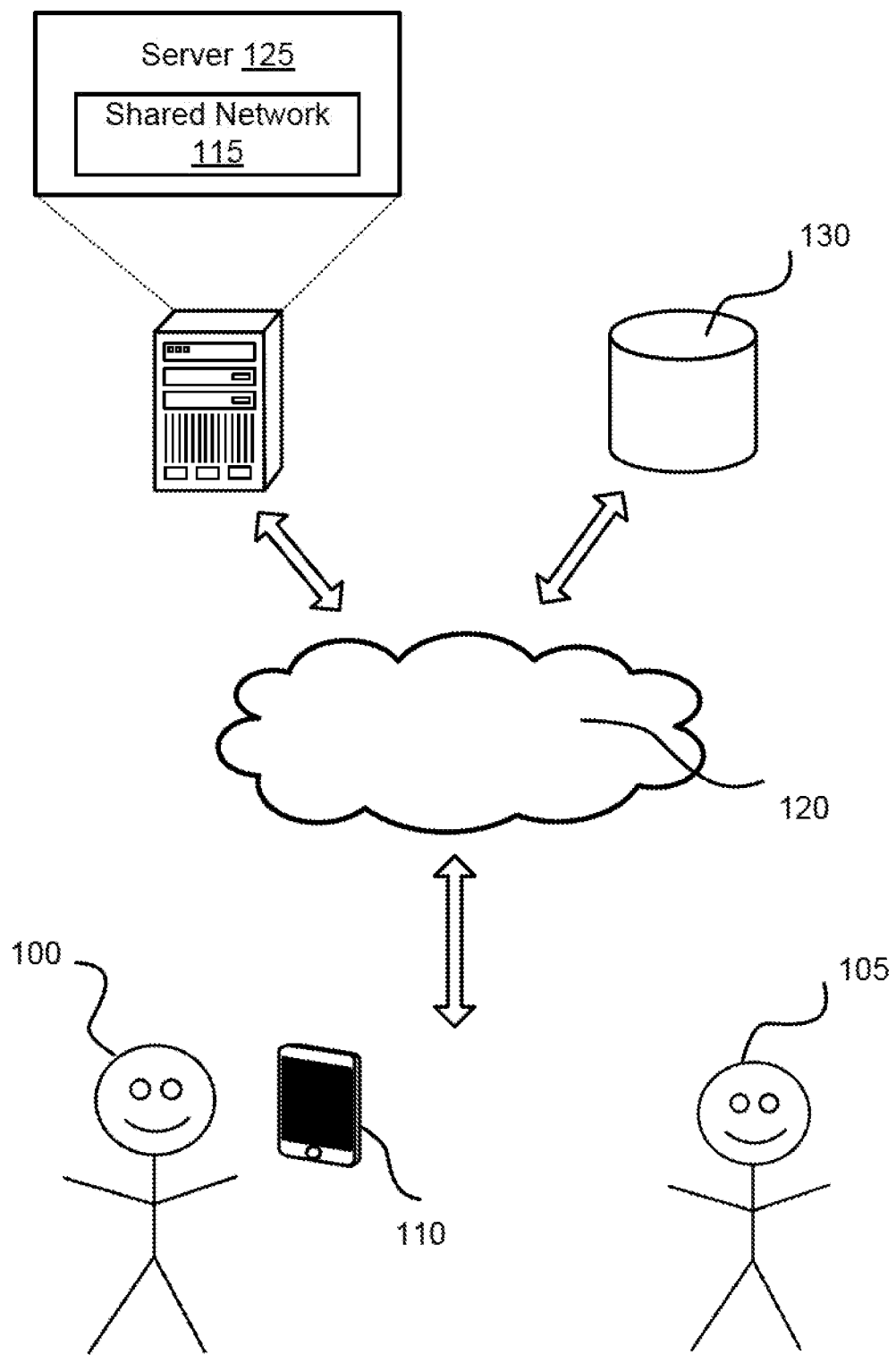
FIG. 1 shows an example of a communication system comprising a user, a subject and shared network according to aspects of the present disclosure.

The present disclosure relates generally to systems and methods for enhancing communication between neurotypical individuals and aneurotypical individuals.

For many aneurotypical individuals (e.g., autistic individuals), it is difficult to realize whether or not his or her conversation partner (e.g., a neurotypical individual) is understanding what he or she says, does, and exhibits. In the meantime, it is difficult to understand if his or her conversation partner is confused, agitated, or if they misunderstand the context of the conversation. Response and reactions from the aneurotypical individual may cause his or her conversation partner to be confused, which leads to conversation breakdown. Similarly, neurotypical individuals often fail to understand the communicative context of aneurotypical individuals which leads to a breakdown in critical communication exchange.

Embodiments of the present disclosure provide methods, systems, and apparatus that supply feedback to neurotypical individuals that allows them to understand needs and response of aneurotypical individuals. By displaying such feedback through various means, (e.g., haptic, augmented reality ("AR"), mixed-reality, mobile application feedback), a communication aid device may provide a user with certain prompts for appropriate action due next steps. Embodiments of the present disclosure can provide ameliorative mechanisms to aid in communication of verbal and non-verbal exchange.

Embodiments of the present disclosure may relay pertinent information at inflection points to secondary user's in the vicinity through means such as haptics, and AR-enabled interface (e.g., context enabled wearable devices) while interacting with individuals exhibiting aneurotypical traits or expressing certain discomfort threshold. An identified subject may be an aneurotypical individual. The subject's personal baseline is established by user experience (e.g., interactions between a neurotypical individual and an aneurotypical individual) within a shared network. In one embodiment, user experience can be ascertained from extracting information from an aneurotypical individual's social network (e.g., Facebook, Twitter, etc.) in compliance with pre-determined privacy rules.

By using crowdsourced data based on supervised and semi-supervised machine learning, a network of connections may be able to establish a baseline psychological profile of the aneurotypical individual. Each user experience may be updated into a "subject dictionary". The "subject dictionary" may function as a database storing user experience information. The "subject dictionary" may also be referred to as a "library of understanding". Analysis obtained from machine learning outcome may provide insight into a subject's psychological state, forming the subject's personal baseline. For example, a user may be able to describe a scenario in which a subject is perceived as being confused or agitated. A user then may upload data to an analytical backend. After certain backend analysis, a subject may be tagged with different kinds of notation for clustering or other purposes. The psychological state data from the tagged subject may be displayed to a user to provide insight into the subject's present emotive state. The user may be guided based upon heuristically analyzed optimal outcomes. Using supervised machine learning to cluster similar actions and behaviors with attributed emotional states, a user is able to identify a likely emotional display of the subject.

The following terms are used throughout the present disclosure:

The term "autistic individual" or "aneurotypical individual" refers to an individual having autism or autism spectrum disorder (ASD) symptoms or other neurological conditions that affect communication (including developmental or attention-deficit disorders). Autism or autism spectrum disorder (ASD) refers to a broad range of conditions characterized by challenges with social skills, repetitive behaviors, speech and nonverbal communication.

The term "neurotypical individual" refers to an individual who thinks, perceives, and behaves in ways that are considered to be normal by the general population.

The term "bag of words" refers to a simplified representation used in natural language processing and information retrieval scenarios. For a bag of words model, a text such as a sentence or a document is represented as the bag or multiset of its words. Grammar or word order may be omitted in the model. Multiplicity of words mentioned in a given text or document may be preserved.

FIG. 1 shows an example of a communication system comprising a user, a subject and a shard network according to aspects of the present disclosure. The example shown includes neurotypical individual 100, aneurotypical individual 105, communication aid 110, shared network 115, communication network 120, server 125, and database 130.

The neurotypical individual 100 and the aneurotypical individual 105 may engage in a conversation, and the neurotypical individual 100 may utilize the communication aid 110 to better understand the verbal and non-verbal communications of the aneurotypical individual 105. In some cases, the communication aid 110 analyzes the conversation and provides feedback to the neurotypical individual 100. The communication aid 110 may provide feedback based on a shared network 115 located on a remote server 125. In some cases, interaction data between the neurotypical individual 100 and the aneurotypical individual 105 (as well as other data gathered from other conversations and other relevant data) may be stored on the database 130.

Communication aid 110 may be an example of, or include aspects of the corresponding element or elements described with reference to FIG. 4. Although FIG. 1 depicts an example where a communication aid 110 communicates with a shared network 115 via communication network 120, in some cases the functions described herein are performed locally on the communication aid 110 (i.e., without relying on communication with remote resources).

In some cases, the server 125 (or the communication aid 110) may utilize an artificial neural network (ANN) to understand the conversation or predict appropriate feedback. An ANN may be a hardware or a software component that includes a number of connected nodes (a.k.a., artificial neurons), which may loosely correspond to the neurons in a human brain. Each connection, or edge, may transmit a signal from one node to another (like the physical synapses in a brain). When a node receives a signal, it can process the signal and then transmit the processed signal to other connected nodes. In some cases, the signals between nodes comprise real numbers, and the output of each node may be computed by a function of the sum of its inputs. Each node and edge may be associated with one or more node weights that determine how the signal is processed and transmitted.

During the training process, these weights may be adjusted to improve the accuracy of the result (i.e., by minimizing a loss function which corresponds in some way to the difference between the current result and the target result). The weight of an edge may increase or decrease the strength of the signal transmitted between nodes. In some cases, nodes may have a threshold below which a signal is not transmitted at all. The nodes may also be aggregated into layers. Different layers may perform different transformations on their inputs. The initial layer may be known as the input layer and the last layer may be known as the output layer. In some cases, signals may traverse certain layers multiple times.

In some examples, the shared network 115 or the database 130 may include information from a set of users who interact with the second user (e.g., an aneurotypical individual 105). In some examples, the shared network 115 may include a machine learning model trained using data about the second user. In some examples, the machine learning model may be configured to predict a conversation action for the first user based on the input data. In some examples, the machine learning model may be configured to predict and feed a conversation action to the first user based on the input data. The shared network 115 and the database 130 may be updated based on the conversation action and the response from interactions between the first user and an aneurotypical user. The shared network 115 may also identify a social network of the second user (e.g., profiles regarding the second user on Facebook, Twitter, etc.), where the shared network 115 is updated based on the information and updates from the second user's social networks.

The shared network 115 may be configured to generate feedback based on the input data, wherein the shared network 115 comprises psychological information about the second user, wherein the shared network 115 is based at least in part on interactions between the second user and a third user.

Figure 2:
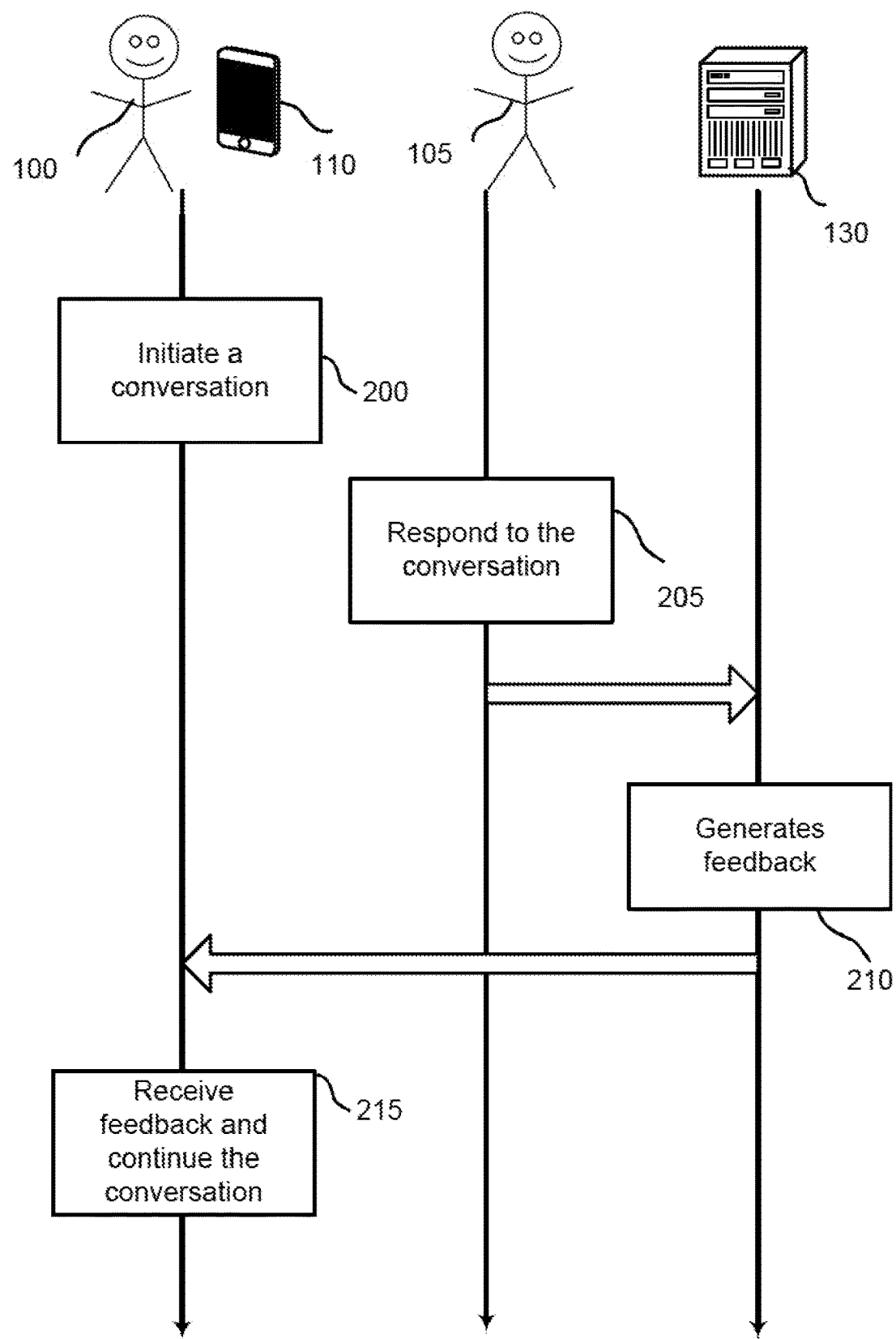
FIG. 2 shows an example of a communication process between two conversing partners according to aspects of the present disclosure.

FIG. 2 shows an example of a communication process between two conversing partners according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 200, a neurotypical individual 100 initiates a conversation with an aneurotypical individual 105. In some cases, the operations of this step may refer to, or be performed by, a neurotypical individual 100 as described with reference to FIG. 1. In some examples, a neurotypical individual 100 approaches an aneurotypical individual 105 who is not currently involved in a conversation and the neurotypical individual 100 initiated a conversation. In some examples, there may be a plurality of neurotypical individuals 100 and a plurality of aneurotypical individuals 105. One of the neurotypical individuals 100 may initiate a conversation in which the aneurotypical individuals 105 are engaged. The conversation may be verbal or nonverbal (e.g., use sign language, or body language).

At operation 205, the aneurotypical individual 105 responds to the conversation. In some cases, the operations of this step may refer to, or be performed by, an aneurotypical individual 105 as described with reference to FIG. 1. In some examples, after a neurotypical individual 100 initiates a conversation, an aneurotypical individual 105 may show interest and engage in the conversation willingly. In some examples, a neurotypical individual 100 may choose to initiate a conversation verbally or non-verbally or a combination thereof, and an aneurotypical individual 105 may respond verbally or non-verbally (e.g., sign language, body language, etc.) or a combination thereof. For example, a neurotypical individual 100 may initiate a conversation verbally, and an aneurotypical individual 105 may respond non-verbally by moving his or her arm or walking towards the neurotypical individual 100.

At operation 210, the system generates feedback based on the response from the aneurotypical individual 105. In some cases, the operations of this step may refer to, or be performed by, a communication aid 110 as described with reference to FIGS. 1 and 4.

At operation 215, the neurotypical individual 100 continues the conversation based on the feedback received by the neurotypical individual 100. In some cases, the operations of this step may refer to, or be performed by, a neurotypical individual 100 as described with reference to FIG. 1. A communication aid 110 may supply feedback to the neurotypical individual 100 that allows them to understand the needs and response of the aneurotypical individual 105. According to embodiments of the present disclosure, such feedback may be displayed through a plurality of means, for example, haptic, augmented reality, mixed-reality, mobile application feedback. In some examples, as illustrated in FIG. 1, a shared network 115 may be configured to generate feedback based on some input data, wherein the shared network 115 comprises psychological information about the aneurotypical individual 105, wherein the shared network 115 is based at least in part on interactions between the aneurotypical individual 105 and a third user.

Figure 3:
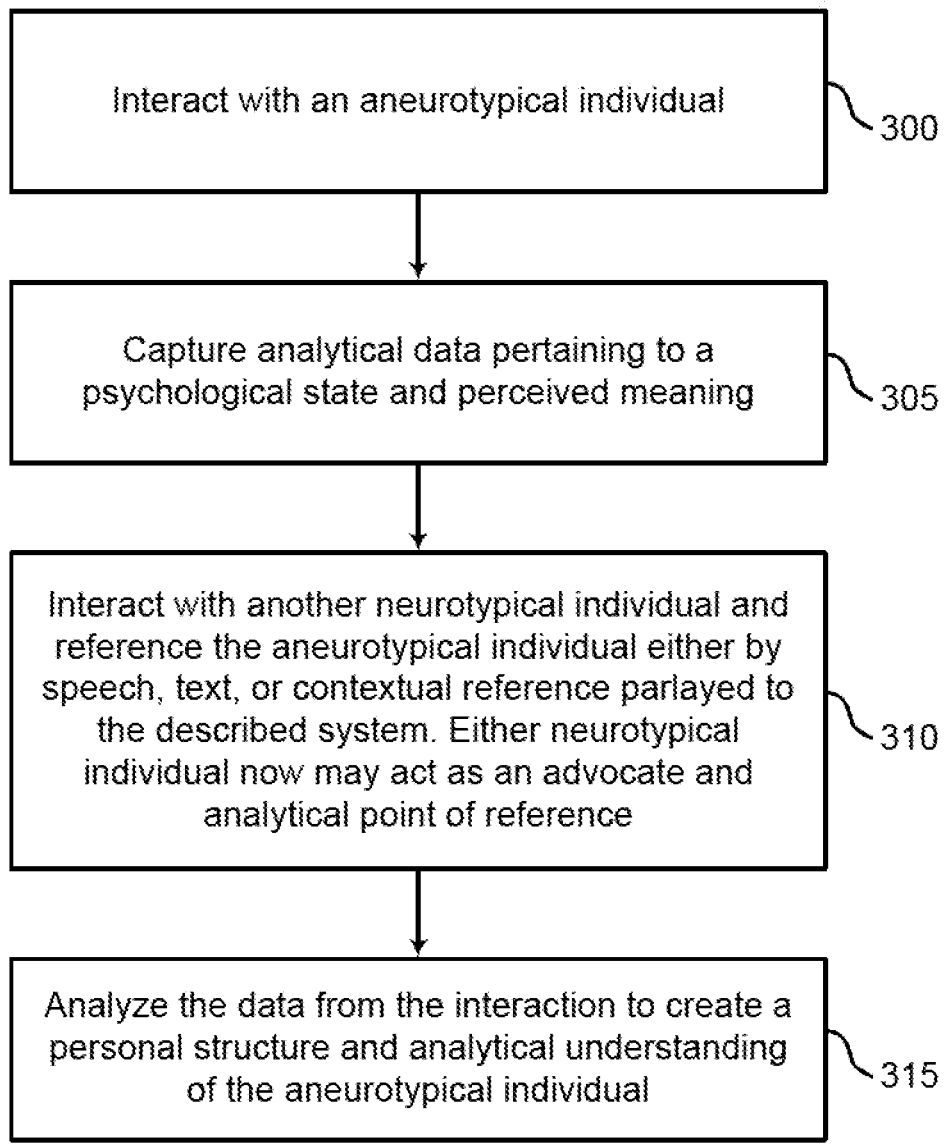
FIG. 3 shows an example of a process for updating an ad hoc network according to aspects of the present disclosure.

FIG. 3 shows an example of a process for updating an ad hoc network according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At operation 300, a user interacts with an aneurotypical individual. In some cases, the operations of this step may refer to, or be performed by, a neurotypical individual 100 as described with reference to FIG. 1. According to one embodiment of the present disclosure, an ad hoc and trusted network may be created surrounding a subject based on level of engagement and social media connections. A subject may be an aneurotypical individual 105 of interest. For example, a user A interacts directly with the subject.

At operation 305, the system captures analytical data pertaining to a psychological state and perceived meaning. In some cases, the operations of this step may refer to, or be performed by, a shared network 115 as described with reference to FIG. 1. Trusted connections may be made along with context as devices and individuals interact. In some cases, using linear discriminant analysis ("LDA") and natural language processing ("NLP"), topical extraction may provide insight into personal connections and data exchange layers of meaning. For example, after interaction between the user A and the subject, they system may capture analytical data pertaining to psychological state and perceived meaning from the subject.

At operation 310, the aneurotypical individual 105 interacts with another neurotypical individual and this neurotypical individual may reference the aneurotypical individual 105 either by speech, text, or contextual reference parlayed to the described system. Either neurotypical individual now may act as an advocate and analytical point of reference in the described system. In some cases, the operations of this step may refer to, or be performed by, an aneurotypical individual 105 as illustrated with reference to FIG. 1. For example, the user A may continue and interact with a user B. The user A may reference the subject during the interaction either by speech, text, or contextual reference parlayed to the described system. The user B now acts as an advocate and analytical point of reference for the described system and model, as does any user X he or she interacts with now or later in context of speech, text, or reference to the subject.

At operation 315, the system analyzes the data from the interaction to create a personal structure and analytical understanding of the aneurotypical individual 105. According to an embodiment of the present disclosure, all analytical data captured by user A up to user X is analyzed (e.g., using NLP or LDA or combination thereof) to create a personal structure and analytical understanding of the subject.

According to one embodiment of the present disclosure, data and analytical circumference regarding the subject may be captured through at least one of the means such as speech (via microphone), visual recognition (via camera), textual exchange (via social media engagement, personal relationship exchange). For example, wearable device may capture all relevant data and process data in accordance with the described system.

One embodiment of the present disclosure describes topical data extraction which may provide a "dictionary of words" revolving around the subject for purpose of further analytical references. Matching of potential users may occur when the subject dictionary is accessed, and context is considered as relevant and within similar relationship with the subject.

In an exemplary embodiment, a dynamic ad-hoc network may be created through portable devices based on passively monitoring communication context with an aneurotypical individual 105 or individuals and determining inflection points to relay said information by linked network creation.

Some embodiments of the present disclosure may apply executional trusted source device connection strategy via one-to-one interaction between user A and user B using bag of words NLP algorithm and determining inflection points to intervene via M2M communication establishment over a training period T. Conversation analysis may be done by classifying intents and also stemming semantic context from the topical interaction units.

Figure 4:
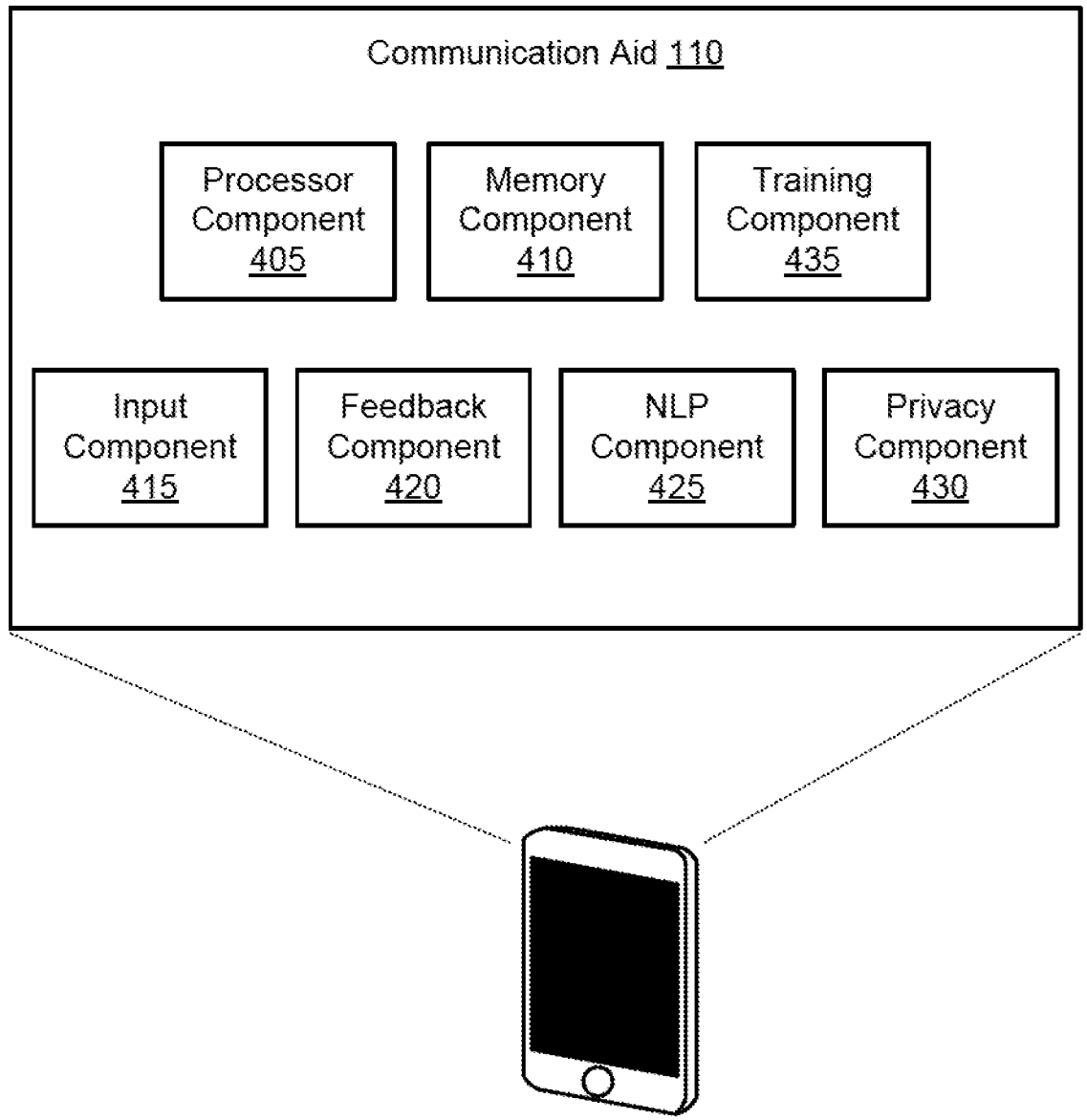
FIG. 4 shows an example of an apparatus providing communication assistance according to aspects of the present disclosure.

FIG. 4 shows an example of an apparatus for communication assistance (i.e., communication aid 110) according to aspects of the present disclosure. Communication aid 110 may be an example of, or include aspects of, the corresponding element or elements described with reference to FIG. 1. Communication aid 110 may include processor component 405, memory component 410, input component 415, feedback component 420, NLP component 425, privacy component 430, and training component 435.

A processor component 405 may include an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the processor may be configured to operate a memory array using a memory controller. In other cases, a memory controller may be integrated into the processor. The processor may be configured to execute computer-readable instructions stored in a memory to perform various functions. In some examples, a processor may include special purpose components for modem processing, baseband processing, digital signal processing, or transmission processing. In some examples, the processor may comprise a system-on-a-chip.

A memory component 410 may store information for various programs and applications on a computing device. For example, the storage may include data for running an operating system. The memory may include both volatile memory and non-volatile memory. Volatile memory may include random access memory (RAM), and non-volatile memory may include read-only memory (ROM), flash memory, electrically erasable programmable read-only memory (EEPROM), digital tape, a hard disk drive (HDD), and a solid state drive (SSD). Memory may include any combination of readable and/or writable volatile memories and/or non-volatile memories, along with other possible storage devices.

Input component 415 may receive input data during a communication between a first user and a second user. In some examples, the input data includes audio data, video data, biofeedback, or any combination thereof. In some examples, a first user may include a neurotypical individual 100, a second user may include an aneurotypical individual 105, and the feedback is configured to facilitate improved communication between the first user and the second user.

Feedback component 420 may generate feedback based on the input data using a shared network 115 including psychological information about the second user, where the shared network 115 is based on interactions between the second user and a third user. Feedback component 420 may also provide the feedback to the first user during the communication. In some examples, the feedback includes visual feedback, audio feedback, haptic feedback, or any combination thereof. In some examples, the feedback includes an indication of a psychological state of the second user. In some examples, the feedback includes an indication of a conversation action for the first user.

Embodiments of the present disclosure provide methods, systems and apparatus that supply feedback to a neurotypical individual 100 or individuals which allows them to understand needs and response of an aneurotypical individual 105. By displaying such feedback through various means, (e.g., haptic, augmented reality, mixed-reality, mobile application feedback), a communication aid 110 device may provide a neurotypical individual 100 (e.g., the first user) with certain prompts for appropriate action due next step or steps. Some exemplary embodiments can provide ameliorative mechanisms to aid in communication and verbal and non-verbal exchange. In one example, prompts may include guidance to change the conversation at hand, restate the most recent statement, soothe an aneurotypical individual 105 in various ways, and enable further conversation and engagement.

Natural language processing (NLP) component 425 may identify an inflection point in the communication, where the feedback is provided based on the identified inflection point. NLP component 425 may use one or more NLP techniques. NLP refers to techniques for programming computers to interpret natural language. In some cases. NLP tasks involve assigning annotation data such as grammatical information to words or phrases within a natural language expression. Different classes of machine-learning algorithms have been applied to NLP tasks. These algorithms may take a set of features generated from the natural language data as input. Some algorithms, such as decision trees, utilize hard if-then rules. Other systems use neural networks or statistical models which make soft, probabilistic decisions based on attaching real-valued weights to input features. These models can express the relative probability of multiple answers.

In some examples, the inflection point includes a transition in a psychological state of the second user. NLP component 425 may also identify a conversation action of the first user. NLP component 425 may also identify a response from the second user. NLP component 425 may also identify one or more words by performing natural language processing on the input data. NLP component 425 may also determine that the one or more words matches a dictionary stored in the shared network 115, where the feedback is generated based on the determination.

Embodiments of the present disclosure can relay pertinent information at inflection points to secondary user's in the vicinity through means such as haptics, and AR-enabled interface (e.g., context enabled wearable devices) while interacting with individuals exhibiting aneurotypical traits or expressing certain discomfort threshold. According to one embodiment, proactive alerts may be generated through interpreting and assessing dynamic feedback pertaining to interaction with individuals exhibiting aneurotypical attributes.

Privacy component 430 may receive authorization from the second user allowing the first user to access the shared network 115, where the feedback is generated based on the authorization.

Training component 435 may identify training data including communication information for the second user, and response information corresponding to the communication information. Training component 435 may also train the machine learning model based on the training data.

Training component 435 may be configured to identify training data comprising communication information for the second user, and response information corresponding to the communication information, and to train a machine learning model of the shared network 115 based on the training data.

In an example, imagine negotiation breakdown in professional communication. Often business negotiations may break down over simple misunderstandings which may be discovered by reactions or responses from ongoing conversations. If both parties can receive feedback about the other, a communication aid 110 of the present disclosure can help parties know where the negotiations are taking an unproductive turn. At that inflection point, negotiating parties may pause or backtrack to ensure the negotiations end on a productive note and beneficial to both parties.

In another example, imagine infants or individuals who have difficulty communicating what they want or need. Infants may not know how to respond to different or complex situations. Consequently, infants may react by instinct. Parent(s) often try multiple things to help soothe infants. However, it may not work because parents are guessing what infants want or need. Since the general reactions are similar in infants with same temperament (e.g., easy baby versus difficult baby), a communication aid 110 helps parents better soothe infants. The communication aid 110 may also assist caregivers, such as babysitters, with better understanding how to take care of infants. For example, using data collected daily involving a subject infant's interactions with its parent(s), a profile may be created for the subject infant that can be accessed by caregivers to provide appropriate attention to the subject infant.

Figure 5:
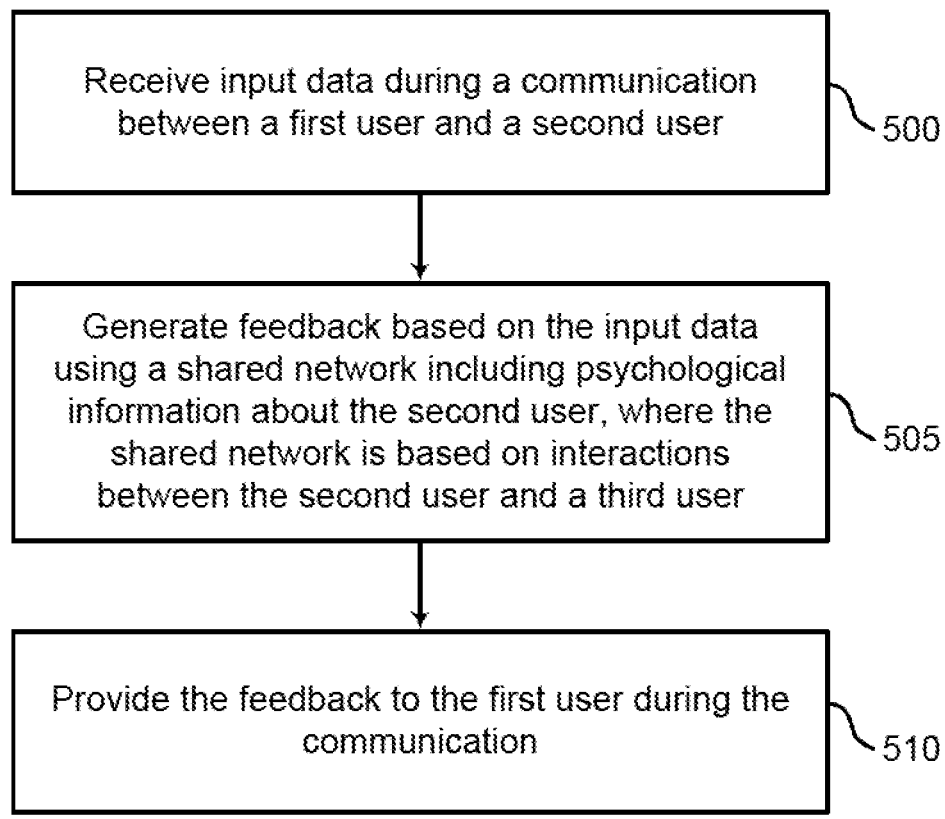
FIG. 5 shows an example of a process for communication assistance for aneurotypical individuals according to aspects of the present disclosure.

FIG. 5 shows an example of a process for communication assistance for aneurotypical individuals according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 500, the system receives input data during a communication between a first user and a second user. In some cases, the operations of this step may refer to, or be performed by, an input component 415 as described with reference to FIG. 4. In an embodiment, input component 415 of the system may receive input data during a communication between a first user and a second user. In some examples, the input data includes audio data, video data, biofeedback, or any combination thereof. In some examples, the first user includes a neurotypical individual 100, the second user includes an aneurotypical individual 105.

At operation 505, the system generates feedback based on the input data using a shared network 115 including psychological information about the second user, where the shared network 115 is based on interactions between the second user and a third user. In some cases, the operations of this step may refer to, or be performed by, a feedback component 420 as described with reference to FIG. 4. Feedback component 420 of the system may generate feedback based on the input data using a shared network 115 including psychological information about the second user, where the shared network 115 is based on interactions between the second user and a third user.

At operation 510, the system provides the feedback to the first user during the communication. In some cases, the operations of this step may refer to, or be performed by, a feedback component 420 as described with reference to FIG. 4. Feedback component 420 may provide the feedback to the first user during the communication. In some examples, the feedback includes visual feedback, audio feedback, haptic feedback, or any combination thereof. In some examples, the feedback includes an indication of a psychological state of the second user. In some examples, the feedback includes an indication of a conversation action for the first user.

For example, imagine strangers meet in a shopping mall. Often when shopping in a mall, a first individual may bump into a second individual (e.g., an acquaintance) who is there with a third individual (e.g., a stranger) unknown to the first individual. At conversation, the first individual and the second individual may be able to understand the nuance of the conversation, which leaves the third individual feeling uncomfortable or confused in the group conversation. A communication aid 110 of the present disclosure can take the known feedback about the third individual and prompt the first individual or the second individual that the conversation is making the third individual uncomfortable or feel left out, which would guide them to adjust the conversation so all conversation partners including the stranger can engage in a meaningful conversation with each other.

Figure 6:
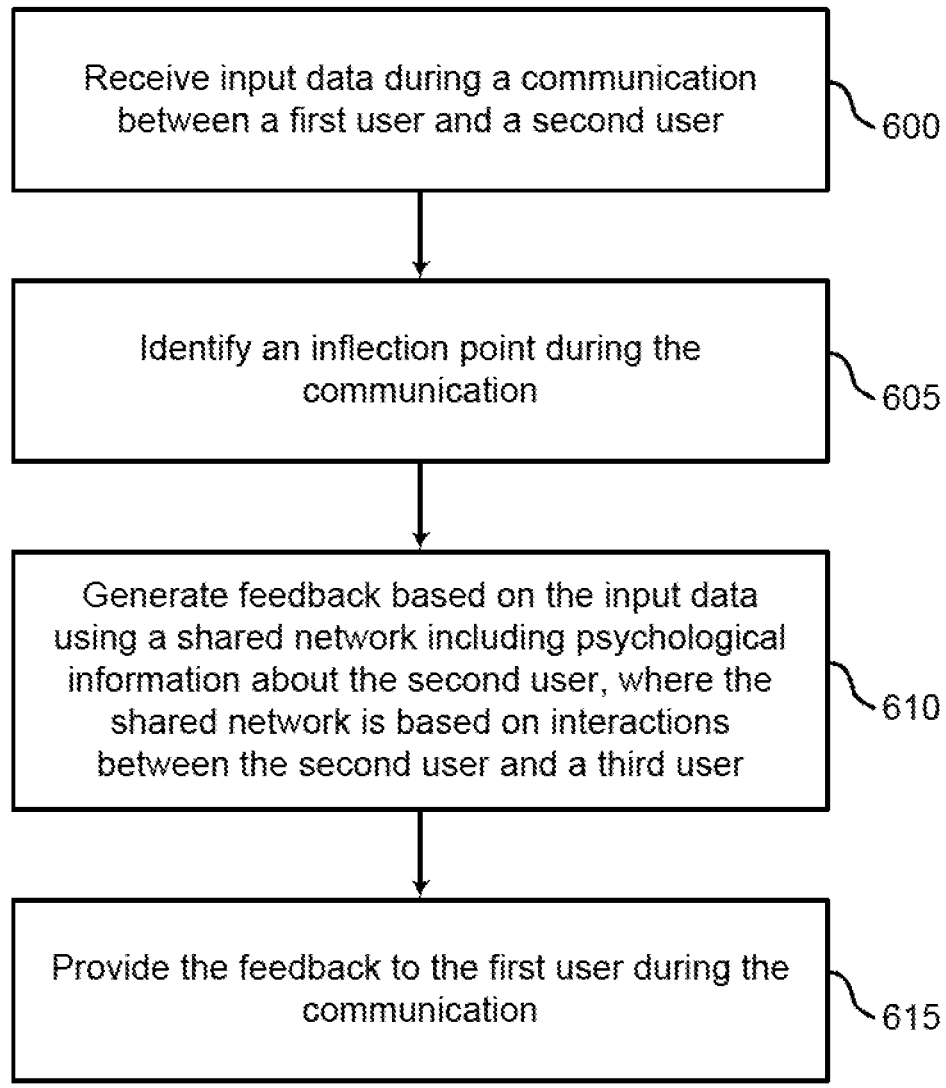
FIG. 6 shows an example of a process for communication assistance for aneurotypical individuals comprising identifying an inflection point during the communication according to aspects of the present disclosure.

FIG. 6 shows an example of a process for communication assistance for aneurotypical individuals comprising identifying an inflection point during the communication according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 600, the system receives input data during a communication between a first user and a second user. In some cases, the operations of this step may refer to, or be performed by, an input component 415 as described with reference to FIG. 4.

At operation 605, the system identifies an inflection point in the communication. In some cases, the operations of this step may refer to, or be performed by, a NLP component 425 as described with reference to FIG. 4. In some examples, the inflection point includes a transition in a psychological state of the second user. NLP component 425 may identify one or more words by performing natural language processing on the input data. NLP component 425 may also determine that the one or more words matches a dictionary stored in the shared network 115. In an embodiment of the present disclosure, analysis obtained from machine learning outcome may provide insight into a subject's psychological state, forming the subject's personal baseline. Using supervised machine learning to cluster similar actions and behaviors with attributed emotional states, a user is able to identify a likely emotional display of the subject. By comparing similar actions and behaviors with attributed emotional states to the input data, the system may identify an inflection point in the communication. For example, the inflection point may indicate that the subject becomes confused, agitated, or misunderstand the context of the communication.

At operation 610, the system generates feedback based on the input data using a shared network 115 including psychological information about the second user, where the shared network 115 is based on interactions between the second user and a third user. In some cases, the operations of this step may refer to, or be performed by, a feedback component 420 as described with reference to FIG. 4.

At operation 615, the system provides the feedback to the first user during the communication. In some cases, the operations of this step may refer to, or be performed by, a feedback component 420 as described with reference to FIG. 4.

In one example, imagine some aneurotypical individuals 105 have a group conversation with some neurotypical individuals 100. Neurotypical individuals 100 may not often think about how the conversation are being received by aneurotypical individuals 105. Some aneurotypical individuals 105 may be perceived as "high-functioning" or they appear to be actively participating in the group conversation. But at some moment, they may become confused, agitated or lost in the conversation. This particular moment may be referred to as an example of an inflection point. Their reactions in the group conversation may change and cause other group members to feel uncomfortable. A communication aid 110 of the present disclosure can assist the neurotypical individuals 100 with knowing when to change the topic of conversation or possibly to change their physical actions in the conversation so that all group members including aneurotypical individuals 105 can remain engaged. Based on subject analysis from a shared network 115, backend computer analysis tools and machine learning model, a neurotypical user is provided with real-time feedback of an aneurotypical individual's experience of the conversation. The feedback may be provided to the user through means such as augmented reality, mixed-reality glasses, haptic feedback, or some mobile application. In some cases, the user of such a wearable device is prompted with the subject's true psychological state and is prompted with ameliorative action for next steps.

Figure 7:
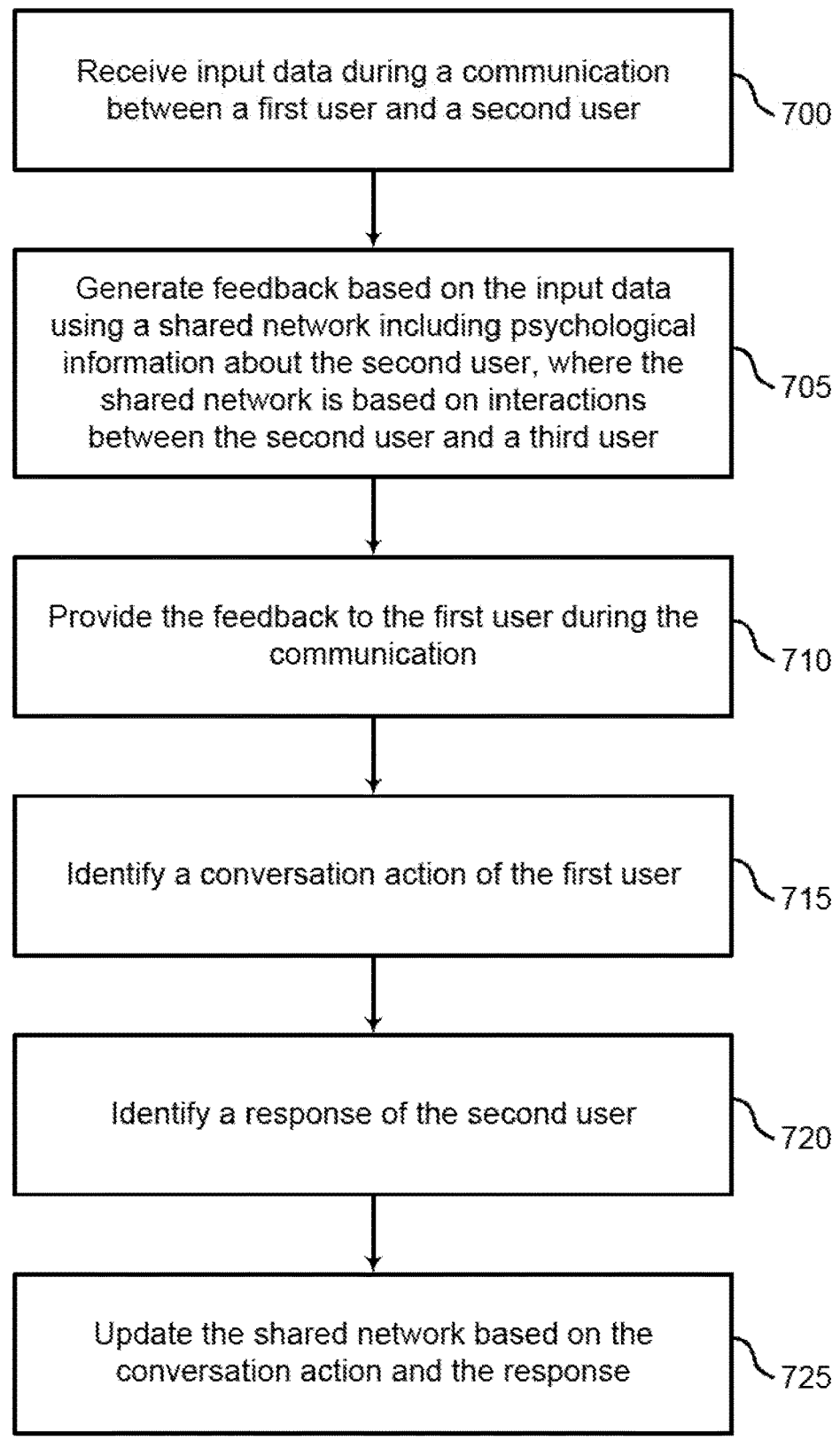
FIG. 7 shows an example of a process for communication assistance for aneurotypical individuals comprising updating the shared network according to aspects of the present disclosure.

FIG. 7 shows an example of a process for communication assistance for aneurotypical individuals comprising updating the shared network 115 according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 700, the system receives input data during a communication between a first user and a second user. In some cases, the operations of this step may refer to, or be performed by, an input component 415 as described with reference to FIG. 4.

At operation 705, the system generates feedback based on the input data using a shared network 115 including psychological information about the second user, where the shared network 115 is based on interactions between the second user and a third user. In some cases, the operations of this step may refer to, or be performed by, a feedback component 420 as described with reference to FIG. 4.

At operation 710, the system provides the feedback to the first user during the communication. In some cases, the operations of this step may refer to, or be performed by, a feedback component 420 as described with reference to FIG. 4.

At operation 715, the system identifies a conversation action of the first user. In some cases, the operations of this step may refer to, or be performed by, a NLP component 425 as described with reference to FIG. 4. As illustrated in FIG. 4, NLP component 425 may identify a conversation action of the first user.

At operation 720, the system identifies a response of the second user. In some cases, the operations of this step may refer to, or be performed by, a NLP component 425 as described with reference to FIG. 4. As illustrated in FIG. 4, NLP component 425 may also identify a response from the second user.

At operation 725, the system updates the shared network 115 based on the conversation action and the response. In some cases, the operations of this step may refer to, or be performed by, a shared network 115 as described with reference to FIG. 1. In an embodiment of the present disclosure, the system may use crowdsourced data based on supervised and semi-supervised machine learning. A network of connections may be able to establish a baseline psychological profile of an aneurotypical individual 105. Each user experience may be updated into a "subject dictionary". The "subject dictionary" may function as a database 130 storing user experience information. In another embodiment, the shared network 115 may include a machine learning model trained using data about the second user. In some examples, the machine learning model may be configured to predict a conversation action for the first user based on the input data. In some examples, the machine learning model is configured to predict and feed a conversation action to the first user based on the input data. The shared network 115 and the database 130 may also be updated based on the conversation action and the response from interactions between the first user and an aneurotypical user. In another embodiment, the shared network 115 may identify a social network of the second user (e.g., profiles regarding the second user on Facebook. Twitter, etc.), where the shared network 115 is updated based on the information and updates from the social networks.

Figure 8:
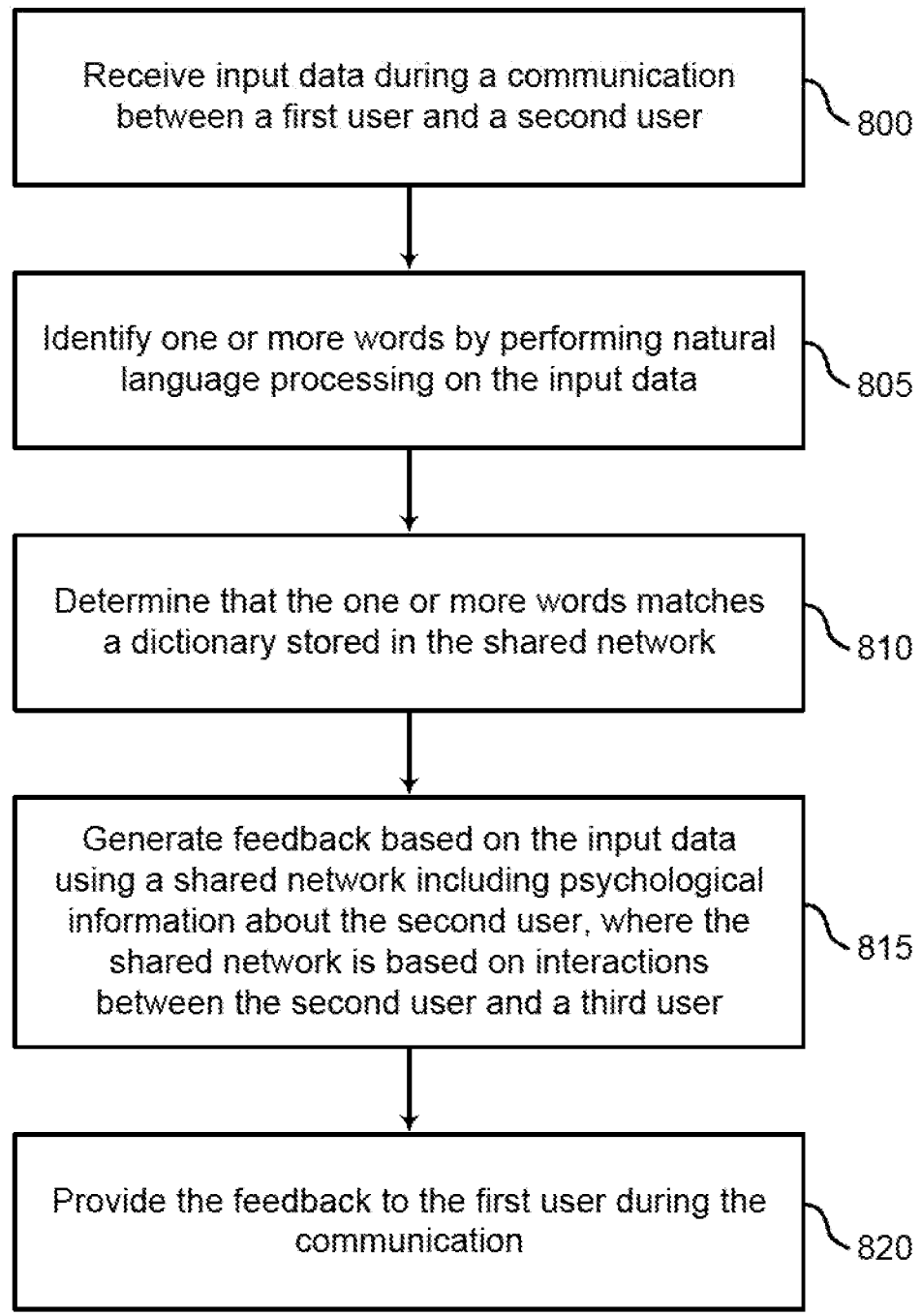
FIG. 8 shows an example of a process for communication assistance for aneurotypical individuals comprising a natural language processing component according to aspects of the present disclosure.

FIG. 8 shows an example of a process for communication assistance for aneurotypical individuals comprising a natural language processing component 425 according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 800, the system receives input data during a communication between a first user and a second user. In some cases, the operations of this step may refer to, or be performed by, an input component 415 as described with reference to FIG. 4.

At operation 805, the system identifies one or more words by preforming natural language processing on the input data. In some cases, the operations of this step may refer to, or be performed by, a NLP component 425 as described with reference to FIG. 4. In an embodiment of the present disclosure, the system may identify one or more words that are relevant to the analysis of an aneurotypical individual's psychological state. These words may be updated to a database 130 for storage. In some cases, the input data may comprise natural language expressions, but not limited thereto. Natural language processing tasks involve assigning annotation data such as grammatical information to words or phrases within the input data.

At operation 810, the system determines that the one or more words matches a dictionary stored in the shared network 115. In some cases, the operations of this step may refer to, or be performed by, a NLP component 425 as described with reference to FIG. 4. According to an embodiment of the present disclosure, the system may use crowdsourced data based on supervised and semi-supervised machine learning. Each user experience is updated into a "subject dictionary". The subject dictionary may function as a database 130 storing user experience information. The one or more words identified may be compared to the subject dictionary and a computer algorithm may be used to determine if there is a partial or complete matching between them.

At operation 815, the system generates feedback based on the input data using a shared network 115 including psychological information about the second user, where the shared network 115 is based on interactions between the second user and a third user. In some cases, the operations of this step may refer to, or be performed by, a feedback component 420 as described with reference to FIG. 4.

At operation 820, the system provides the feedback to the first user during the communication. In some cases, the operations of this step may refer to, or be performed by, a feedback component 420 as described with reference to FIG. 4.

Figure 9:
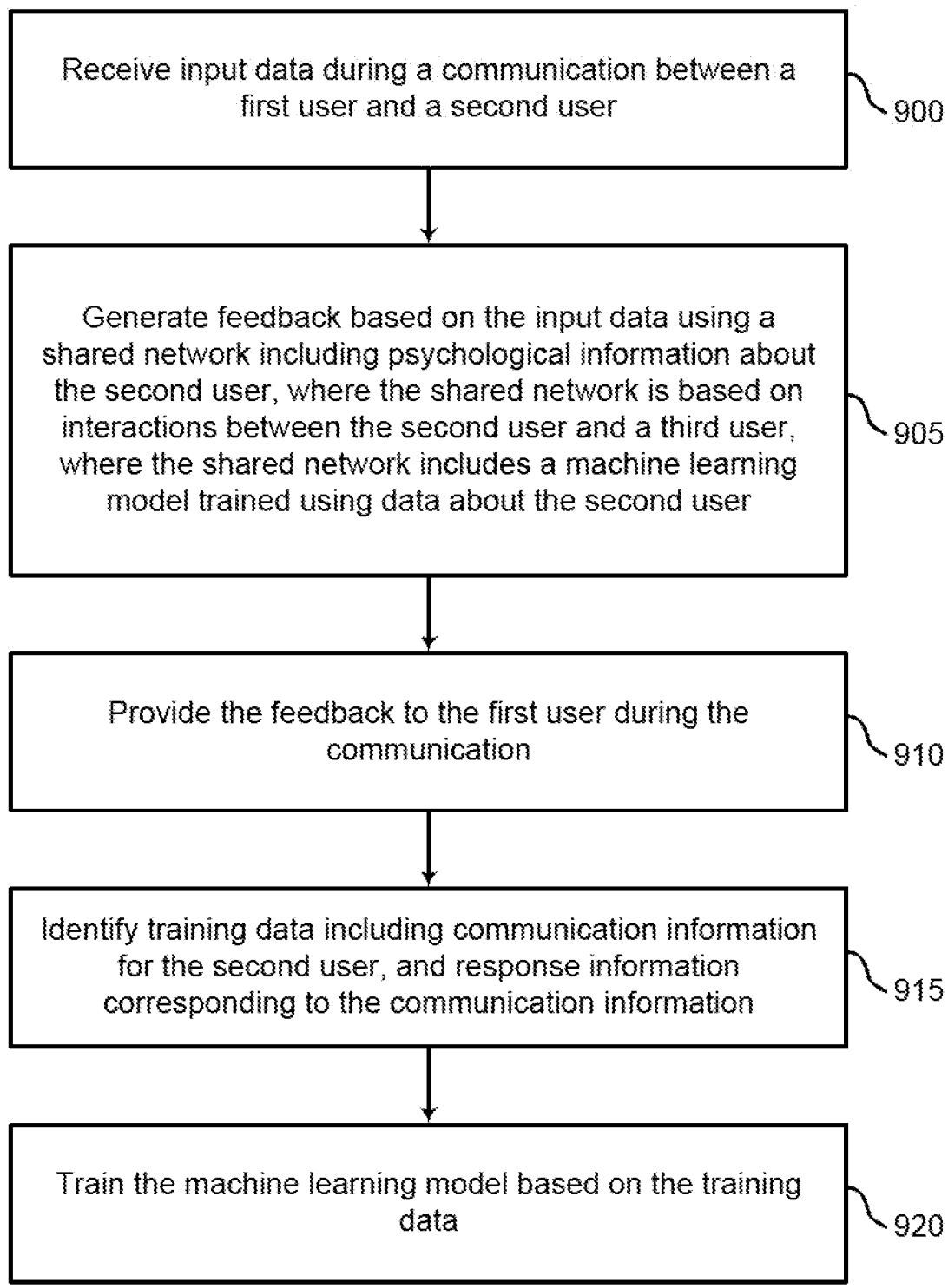
FIG. 9 shows an example of a process for communication assistance for aneurotypical individuals comprising a machine learning model according to aspects of the present disclosure.

FIG. 9 shows an example of a process for communication assistance for aneurotypical individuals comprising a machine learning model according to aspects of the present disclosure. In some examples, these operations may be performed by a system including a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At operation 900, the system receives input data during a communication between a first user and a second user. In some cases, the operations of this step may refer to, or be performed by, an input component 415 as described with reference to FIG. 4.

At operation 905, the system generates feedback based on the input data using a shared network 115 including psychological information about the second user, where the shared network 115 is based on interactions between the second user and a third user, where the shared network 115 includes a machine learning model trained using data about the second user. In some cases, the operations of this step may refer to, or be performed by, a feedback component 420 as described with reference to FIG. 4. According to embodiments of the present disclosure, a subject's personal baseline may be established by user experience within a shared network 115. By using crowdsourced data based on supervised and semi-supervised machine learning, a network of connections is able to establish a baseline psychological profile of an aneurotypical individual 105.

At operation 910, the system provides the feedback to the first user during the communication. In some cases, the operations of this step may refer to, or be performed by, a feedback component 420 as described with reference to FIG. 4. In an embodiment of the present disclosure, a first user may be prompted with a subject's psychological state and subsequent prescriptive action. The first user may receive feedback in one of the following ways, for example, augmented reality, mixed-reality glasses, binary haptic feedback, and mobile application. Prescriptive action may ameliorate or dictate a new direction of conversation based on subject's needs.

At operation 915, the system identifies training data including communication information for the second user, and response information corresponding to the communication information. In some cases, the operations of this step may refer to, or be performed by, a training component 435 as described with reference to FIG. 4. In an embodiment of the present disclosure, training data may include interaction between a user and a subject. The user may include a neurotypical individual 100. The subject may include an aneurotypical individual 105. The interaction may include a conversation between the user and the subject. For example, response from the subject during the conversation may indicate whether the subject feels confused, agitated or misunderstands the context of the conversation or not.

At operation 920, the system trains the machine learning model based on the training data. In some cases, the operations of this step may refer to, or be performed by, a training component 435 as described with reference to FIG. 4. According to embodiments of the present disclosure, each user experience is updated into a "subject dictionary". The "subject dictionary" functions as a database 130 storing user experience information. Analysis obtained from machine learning outcome provide insight into subject psychological state. In one embodiment, based upon crowdsourced data and analytical insights using Long Short-Term Memory Convolutional Neural Network ("LSTM-CNN") framework infused with a bag of words model, a neurotypical user is able to ascertain data comprising the subject's current psychological state and variance from baseline.

For example, a user may describe a scenario in which a subject is perceived as having been confused or agitated. A user then uploads data to an analytical backend. The analytical backend may be equipped with database for storage and certain computer analysis and processing devices. In some cases, the analytical backend may nm a user's tone analysis such as speech to text review, etc. After backend analysis, the subject may be tagged with different kinds of notation for clustering or other purpose. Psychological state data from the tagged subject may be displayed to a neurotypical user to provide insight into the subject's present emotional state. The user may be guided based upon heuristically analyzed optimal outcomes. Using supervised machine learning to cluster similar actions and behaviors with attributed emotional states, the user may identify a likely emotional display of the subject, even if such display is incongruent from normative processing. In some embodiments, neurotypical users may verify, modify, or invalidate all outcomes with specificity between displayed outcome and actual experience. Data added by users may formulate future analyzed outcomes and influence prompts, feedback or conversational prescriptions.

In some cases, there are individuals who cannot adequately communicate what they want or need. The communication may relate to disease or injury that these individuals are suffering. Their reactions to different scenarios are consistent and may be learned and stored in a database 130 that can later be accessed and used by someone else, with assistance from a communication aid 110 and machine learning model of the present disclosure. The communication aid 110 may help reduce the amount of stress that is experienced by individuals who are suffering from injury and attempt to communicate what they want or need. The communication aid 110 may improve quality of communication.

Accordingly, the present disclosure includes the following embodiments.

A method for communication assistance for aneurotypical individuals is described. Embodiments of the method may comprise receiving input data during a communication between a first user and a second user, generating feedback based on the input data using a shared network comprising psychological information about the second user, wherein the shared network is based at least in part on interactions between the second user and a third user, and providing the feedback to the first user during the communication.

An apparatus for communication assistance for aneurotypical individuals is described. The apparatus may include a processor, memory in electronic communication with the processor, and instructions stored in the memory. The instructions may be operable to cause the processor to receive input data during a communication between a first user and a second user, generate feedback based on the input data using a shared network comprising psychological information about the second user, wherein the shared network is based at least in part on interactions between the second user and a third user, and provide the feedback to the first user during the communication.

A non-transitory computer readable medium storing code for communication assistance for aneurotypical individuals is described. In some examples, the code comprises instructions executable by a processor to: receive input data during a communication between a first user and a second user, generate feedback based on the input data using a shared network comprising psychological information about the second user, wherein the shared network is based at least in part on interactions between the second user and a third user, and provide the feedback to the first user during the communication.

In some examples, the input data comprises audio data, video data, biofeedback, or any combination thereof. In some examples, the feedback comprises visual feedback, audio feedback, haptic feedback, or any combination thereof. In some examples, the first user comprises a neurotypical individual, the second user comprises an aneurotypical individual, and the feedback is configured to facilitate improved communication between the first user and the second user.

In some examples, the feedback comprises an indication of a psychological state of the second user.

In some examples, the feedback comprises an indication of a conversation action for the first user.

In some examples, the shared network comprises a database of information from a plurality of users who interact with the second user.

In some examples, the shared network comprises a machine learning model trained using data about the second user.

Some examples of the method, apparatus, non-transitory computer readable medium, and system described above may further include identifying training data comprising communication information for the second user, and response information corresponding to the communication information. Some examples may further include training the machine learning model based on the training data.

In some examples, the machine learning model is configured to predict a psychological state of the second user based on the input data. In some examples, the machine learning model is configured to predict a conversation action for the first user based on the input data.

Some examples of the method, apparatus, non-transitory computer readable medium, and system described above may further include identifying an inflection point in the communication, wherein the feedback is provided based on the identified inflection point.

In some examples, the inflection point comprises a transition in a psychological state of the second user.

Some examples of the method, apparatus, non-transitory computer readable medium, and system described above may further include receiving authorization from the second user for the first user to access the shared network, wherein the feedback is generated based on the authorization.

Some examples of the method, apparatus, non-transitory computer readable medium, and system described above may further include identifying a conversation action of the first user. Some examples may further include identifying a response of the second user. Some examples may further include updating the shared network based on the conversation action and the response.

Some examples of the method, apparatus, non-transitory computer readable medium, and system described above may further include identifying a social network of the second user, wherein the shared network is based at least in part on the social network.

Some examples of the method, apparatus, non-transitory computer readable medium, and system described above may further include identifying one or more words by performing natural language processing on the input data. Some examples may further include determining that the one or more words matches a dictionary stored in the shared network, wherein the feedback is generated based on the determination.

An apparatus for communication assistance for aneurotypical individuals is described. Embodiments of the apparatus may include an input component configured to receive input data during a communication between a first user and a second user, a shared network configured to generate feedback based on the input data, wherein the shared network comprises psychological information about the second user, wherein the shared network is based at least in part on interactions between the second user and a third user, and a feedback component configured to provide the feedback to the first user during the communication.

A method of manufacturing an apparatus for communication assistance for aneurotypical individuals is described. The method may include providing an input component configured to receive input data during a communication between a first user and a second user, providing a shared network configured to generate feedback based on the input data, wherein the shared network comprises psychological information about the second user, wherein the shared network is based at least in part on interactions between the second user and a third user, and providing a feedback component configured to provide the feedback to the first user during the communication.

A method of using an apparatus for communication assistance for aneurotypical individuals is described. The method may include using an input component configured to receive input data during a communication between a first user and a second user, using a shared network configured to generate feedback based on the input data, wherein the shared network comprises psychological information about the second user, wherein the shared network is based at least in part on interactions between the second user and a third user, and using a feedback component configured to provide the feedback to the first user during the communication.

Some examples of the apparatus, system, and method described above may further include a training component configured to identify training data comprising communication information for the second user, and response information corresponding to the communication information, and to train a machine learning model of the shared network based on the training data.

Some examples of the apparatus, system, and method described above may further include a privacy component configured to receive authorization from the second user for the first user to access the shared network, wherein the feedback is generated based on the authorization.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair. DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for enhanced communication, comprising:
receive input data during a communication between a first user and a second user, wherein the first user initiates a first conversation action;
identify an inflection point in the communication by performing natural language processing on the input data, wherein the inflection point comprises a transition in a psychological state of the second user;
generate feedback based on the input data using a shared network trained to identify one or more words that matches a dictionary stored in the shared network to obtain the inflection point, wherein the shared network is based at least in part on interactions between the second user and a third user, and wherein the dictionary is updated based on interaction data related to the second user; and
provide the feedback to the first user indicating a second conversation action that is different from the first conversation action during the communication.

2. The method of claim 1, wherein:
the input data comprises audio data, video data, biofeedback, or any combination thereof.

3. The method of claim 1, wherein:
the feedback comprises visual feedback, audio feedback, haptic feedback, or any combination thereof.

4. The method of claim 1, wherein:
the first user comprises a neurotypical individual, the second user comprises an aneurotypical individual, and the feedback is configured to facilitate improved communication between the first user and the second user.

5. The method of claim 1, wherein:
the feedback comprises an indication of the psychological state of the second user.

6. The method of claim 1, wherein:
the feedback comprises an indication of the second conversation action for the first user.

7. The method of claim 1, wherein:
the shared network comprises a database of information from a plurality of users who interact with the second user.

8. The method of claim 1, wherein:
the shared network comprises a machine learning, model trained using data about the second user.

9. The method of claim 8, further comprising:
identify training data comprising communication information for the second user, and response information corresponding to the communication information; and
train the machine learning model based on the training data.

10. The method of claim 8, wherein:
the machine learning model is configured to predict the psychological state of the second user based on the input data.

11. The method of claim 8, wherein:
the machine learning model is configured to predict the second conversation action for the first user based on the input data.

12. The method of claim 1,
wherein the feedback is provided based on the identified inflection point.

13. The method of claim 1, further comprising:
identify the one or more words by performing natural language processing on the input data; and determine that the one or more words matches the dictionary stored in the shared network, wherein the feedback is generated based on the determination.

14. The method of claim 1, further comprising:
receive authorization from the second user for the first user to access the shared network, wherein the feedback is generated based on the authorization.

15. The method of claim 1, further comprising:
identify a conversation action of the first user;
identify a response of the second user; and
update the shared network based on the conversation action and the response.

16. The method of claim 1, further comprising:
identify a social network of the second user, wherein the shared network is based at least in part on the social network.

17. An apparatus for enhanced communication, comprising:
an input component configured to receive input data during a communication between first user and a second user, wherein the first user initiates a first conversation action;
a natural language processing (NLP) component configured to identify an inflection point in the communication by performing natural language processing on the input data, wherein the inflection point comprises a transition in a psychological state of the second user;
a shared network configured to generate feedback based on the input data, wherein the shared network is trained to identify one or more words that matches a dictionary stored in the shared network to obtain the inflection point, wherein the shared network is based at least in part on interactions between the second user and a third user, and wherein the dictionary is updated based on interaction data related to the second user; and
a feedback component configured to provide the feedback to the first user indicating a second conversation action that is different from the first conversation action during the communication.

18. The apparatus of claim 17, further comprising:
a privacy component configured to receive authorization from the second user for the first user to access the shared network, wherein the feedback is generated based on the authorization.

19. The apparatus of claim 17, further comprising:
a training component configured to identify training data comprising communication information for the second user, and response information corresponding to the communication information, and to train a machine learning model of the shared network based on the training data.

* * * * *